United States Patent Office 3,606,760
Patented Sept. 21, 1971

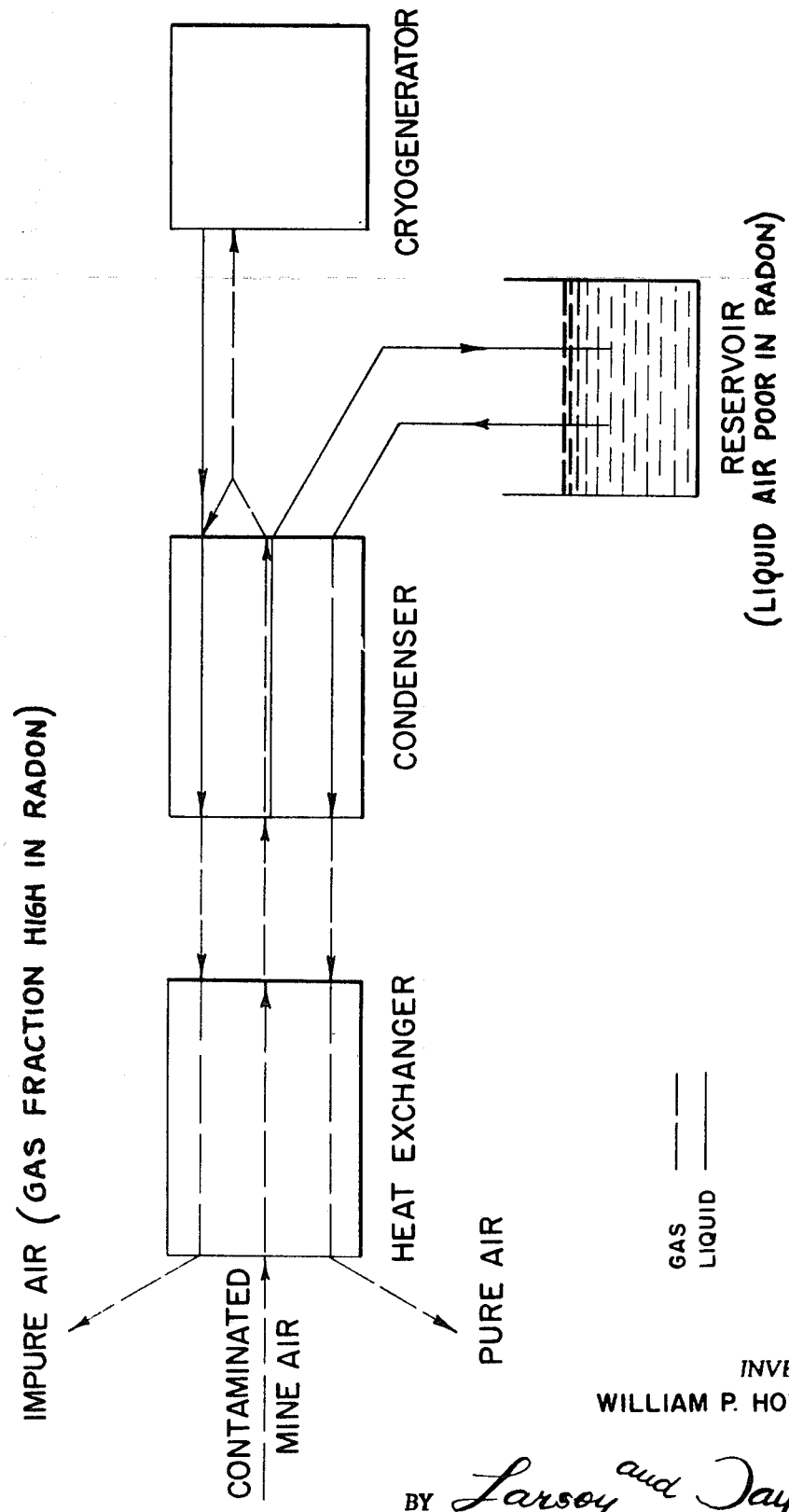

3,606,760
METHOD FOR PURIFICATION OF
RADON-CONTAINING AIR
William P. Howell, 5941 Crestmont Ave.,
Livermore, Calif. 94550
Filed Feb. 29, 1968, Ser. No. 709,278
Int. Cl. F25j 1/02, 3/08, 3/04
U.S. Cl. 62—11                                    11 Claims

ABSTRACT OF THE DISCLOSURE

Radon-containing mine air is purified by partially condensing impure air, discarding the uncondensed fraction as waste, and vaporizing the liquid fraction to form a purified air fraction.

The present invention relates to a method and apparatus for purifying air containing radioactive radon gas impurity. More particularly, the invention relates to purification of air containing up to 1000 working levels of radon. Still more particularly, the invention relates to purification of mine air.

In the mining of uranium, it is necessary to ensure that the amount of radioactive radon gas is kept below acceptable maximum concentrations for safety purposes. Various attempts have been made to obtain acceptable working levels, but it has proven difficult and costly to do so. The present safety level of 100 pico curies of radon activity, or 1 "working level" is the equivalent of $1.76 \times 10^3$ atoms/cm.$^3$ which is equivalent to less than one atom of radon for every $10^{16}$ atoms or molecules of air. Impurity of 10 working levels is the equivalent of about 1 atom of radon for every $10^{15}$ atoms or molecules of air. It will thus be readily appreciated that purification of air from 10 working levels or more down to 1 working level or less, as contemplated by the present invention, would be extremely difficult and costly by conventional means. For example, to perform the required task by ventilating with fresh air would require introducing large quantities of pure air to the stope in question which may be located a good distance from the source of pure air.

It is an object of the invention to provide a process and apparatus for the purification of radon-containing air. It is a further object of the present invention to provide a method and apparatus for purifying radon-containing mine air.

These and other objects which will be apparent to one having ordinary skill in the art are achieved by partially condensing radon-containing air, discarding the uncondensed fraction as waste, and vaporizing the condensed fraction to provide a purified air fraction.

According to the invention, air containing up to 500 or 1000 working levels of radon is partially condensed. By condensing up ot about 95% of the air in this manner, an uncondensed, radon rich fraction and a condensed, radon poor fraction, are formed. The uncondensed phase is vented as waste and the condensed fraction is vaporized and utilized as purified air. The amount of radon in the air is thus reduced by a factor of 10:1 to 20:1 and more. Details of the process and apparatus according to the invention are given in the following detailed specification which includes several examples and a drawing, the sole figure of which shows a diagrammatic flow sheet of the process and apparatus according to the invention.

EXAMPLES 1–6

A contaminated air source is provided by placing either 450 or 150 pounds of crushed uranium ore in a sealed 55 gallon drum which includes a circulating blower. The sealed drum is left undisturbed for several hours so that the radon concentration in the air will build up to its equilibrium value. A Pyrex glass tube is placed in a liquid nitrogen-filled Dewar flask and this unit is lowered into the steel drum. The drum is quickly resealed to minimize radon loss and the blower is started to maintain circulation of the impure air in the drum. The drum is maintained at the appropriate pressure by a vacuum pump and a vent which permits ambient air to flow into the drum through a check valve which prevents the flow of air out of the drum. After a period of time, a suitable amount of liquid forms in the Pyrex glass tube. After the liquid is formed, a quantity of air is drawn from the drum by means of a vacuum pump and put into a Mylar gas collection bag for subsequent analysis. The Pyrex glass test tube containing the liquid is then fitted with a rubber stopper containing an inlet tube and a long center draw-off tube extending to the bottom of the Pyrex glass tube. Compressed air is then introduced into the Pyrex glass tube through the inlet tube and the resulting overpressure forces the liquid up the draw off tube. Once out of the cold test tube, the liquid quickly vaporizes and enters a Mylar collection bag as a gas. After all samples have been collected, 3 to 5 micron smoke particles are blown into the Mylar bags and the bags are left 30 to 40 minutes to allow the concentration of radon daughter particles to build to approximately 50% of the equilibrium value. Air is then drawn from each bag with a calibrated air pump which is conveniently set at 4.5 liters per minute and the air is passed through a Fiberglas absolute filter such as Gelman Instrument Company Fiberglas filter paper, type E. The filter paper catches virtually all of the radon daughter particles since they are not gaseous in nature. The radioactivity of the filters is then measured to compare the radioactivity of the purified gas with the impure air to determine the amount of radon removed. A suitable device for this purpose is an Eberline Lin-Log Alpha counter, Model PRM–4R. The technique of measuring daughter particle activity to infer the radon gas concentration is well established in the art and is used by government agencies such as the U.S. Bureau of Mines. The following data is illustrative of the foregoing process:

| Example Number | Amount of uranium (lbs.) | Temperature (° K.) | Pressure (atm.) | Duration of condensation (hr.) | Radon concentration | | Reduction ratio |
| | | | | | Impure air (W.L.) | Vap. air (W.L.) | |
|---|---|---|---|---|---|---|---|
| 1 [1] | 450 | 77 | 1.8 | 1.0 | 175 | 35 | 5:1 |
| 2 | 450 | 77 | 1.5 | 1.0 | 200 | 20 | 10:1 |
| 3 | 450 | 77 | 1.5 | 1.0 | 2,400 | ?00 | 8:1 |
| 4 | 150 | 77 | 1.1 | 2.0 | 2.25 | .175 | 12:1 |
| 5 | 150 | 77 | 1.0 | 3.0 | 3.5 | .225 | 16:1 |
| 6 | 150 | 77 | 1.0 | 3.0 | 3.5 | .175 | 20:1 |

[1] 3 min. purge of barrel just prior to experiment to reduce the radon concentration.

In Example 6, prior to removal of the liquid condensate from the Pyrex glass tube, helium gas cooled to 77° K. is bubbled through the liquid condensate. This additional step reduces still further the radon concentration in the condensed liquid.

It will be recognized that the processes described above were of the "batch" type and also did not provide for venting the waste. However, the process may be carried out semicontinuously or continuously and the waste may be vented as shown in the example which follows:

EXAMPLE 7

A continuously operating device is located in a stope as shown in the drawing. Mine air is introduced into the apparatus by a suitable pump at a rate which will depend upon the size of the processing equipment. In this example, the design rate is for 1000 c.f.m. The apparatus comprises a condenser which continuously partially condenses the mine air, together with auxiliary equipment to provide refrigeration and may include a heat exchanger which utilizes cold effluent gas to pre-cool the mine air prior to partial condensation thereof. Refrigeration is conveniently provided by a cryogenerator. For processing up to 1000 c.f.m. of mine air, a unit having a capacity of 12,000 B.t.u./hr. at −320° F. is suitable, such as Norelco Cryogenerator Model "B" which utilizes Commercial Grade A helium at 315 p.s.i.g. as the working medium. For processing up to 250 c.f.m. of mine air, a smaller unit having a capacity of 3,000 B.t.u./hr. at −320° F. is suitable such as Norelco Cryogenerator Model "A" which utilizes Commercial Grade A helium at 325 p.s.i.g. as the working medium. The cryogenerator and its associated heat exchange equipment are conveniently provided in an insulated enclosure not shown in the drawing and which may be of any known type.

Mine air is introduced into the apparatus at a rate of up to 1000 c.f.m. where the larger cryogenerator is employed. The air is conveniently first pre-cooled in a heat exchanger to reduce the subsequent condensing load. In this example, the air is then introduced into the condenser where up to about 95% of the air is condensed. The liquid represents the purified air and this may be simply vented into the mine to replace the processed air. It is preferred, however, to utilize the liquified fraction to pre-cool impure mine air and/or to provide additional cooling for partial condensation. In this example, the liquid air is passed through both the condenser and heat exchanger during which time it is vaporized and discharged from the device as purified air. This purified air can be utilized in the immediate vicinity of the apparatus or it may be directed by suitable conduit to more remote areas of the mine. The cold uncondensed air, which contains the major proportion of the radon atoms—in this case about 90 to 95% or more of the radon atoms—is conveniently utilized to remove heat from the condenser and/or heat exchanger. In this example, some of the uncondensed air is liquefied in the cryogenerator and the cold liquid air is utilized as the refrigerant in the condenser. The contaminated stream is, of course, kept separate from the purified stream in the apparatus. The contaminated air stream discharged from the apparatus is vented to the mine surface or to an unused or mined-out area of the mine.

Prior to passing the purified liquid air fraction back through the heat exchange units, the liquid may be treated to remove radon therefrom by treatment with cold helium gas as mentioned in connection with Example 6. In this case, the helium gas, after bubbling through the liquid air, is treated as contaminated air and processed in the same manner. For example, the cold helium gas may be used to remove heat from the condenser and/or heat exchanger and may be mixed into the contaminated fraction for this purpose.

The effectiveness of the process to reduce the amount of radon in the air depends to some extent on the nature of the partial condensation step. It is preferred to cause the air to condense slowly since radon can be trapped in the liquid during the liquefaction process. Liquid air left in contact with contaminated air does not pick up an appreciable number of radon atoms. However, radon trapped in the condensate will remain trapped until natural diffusion or agitation of the liquid causes them to be released. Suitable agitation to remove trapped atoms can be conveniently achieved by bubbling a cold inert gas, such as helium, through the condensate. The gas should be cooled, of course, to a temperature below the boiling point of the liquid. Since this step would add to the process total cost, it is preferable to use helium bubble-through only as an expedient to provide a temporary increase in the total air output.

As mentioned above, the air is preferably condensed slowly to prevent trapping excessive amounts of radon in the condensate. Relatively slow condensation will prevent an excessive build-up of radon atoms at the air-liquid interface. If the concentration of radon atoms at the interface is permitted to build up, as by excessively rapid liquefaction to temporarily increase total output, an excessive amount of radon atoms will be trapped in the condensate, thus rendering the subsequent agitation step a practical requirement. By experiment it was determined that excessive radon build up will be avoided if the molecular drift velocity at the liquid-vapor interface is not permitted to exceed 100 cm./min. This limitation can be qualitatively explained by considering the relation from the kinetic root mean square displacement during a time $t$ in a one dimensional diffusion process is equal to $(2\ Dt)$ wherein D is the diffusion coefficient. Using 0.5 as an approximation for D, calculation indicates, for example, that it takes about one hour for radon to spread 60 cm. through air. Considering this relatively slow natural diffusion rate with the general transport equation, it can be shown that a molecular drift velocity in excess of 100 cm./min. at the air-liquid interface would probably impede natural diffusion away from the interface, and cause an excessive build up of radon. The same limitation is achieved by limiting the liquefaction rate to a maximum of about 3.4 cubic feet of gaseous air per square foot of condenser surface per minute.

The present process is applicable to air having a wide latitude in the initial radon concentration. The amount of radon is consistenly reduced by a factor of from 10:1 to 20:1 and better, which corresponds to removal of from 90 to 95% of the radon atoms. The maximum acceptable concentration of radon that is allowed in mine air by the current radiation standards is one "working level," the equivalent of 100 pico curies of radon activity per liter of mine air, which is equivalent to $1.76 \times 10^3$ atoms of radon/cm.³. Analogously, 10 working levels would be $1.76 \times 10^4$ atoms/cm.³. The process is effective at 500 working levels which would be near the upper limit of concentration encountered in a mine. Of course, with such high working levels, a reduction by a factor of 10 or 20 to 1 would not bring the radon concentration down to the presently acceptable level of one working level in one air change. In this event, the total air output could be increased to produce air of maximum purity by a temporary increase in the rate of condensation with simultaneous agitation of the liquefied air to release trapped radon atoms. Also, where very high radon concentrations are encountered, the purified air fraction can be re-purified in a series of cycles until the required level is reached. As a practical matter the number of total air changes per hour becames excessive where the air contains over 1000 working levels of radon and it is therefore preferred to limit application of the process to purification of air having no more than 1000 working levels of radon. It is still more preferable to limit application of the process to purification of air having no more than 500 working levels of radon, such as mine air.

The amount of air condensed can vary widely. It is generally preferred to condense the major proportion of the impure air and still more preferable to condense at least 85% or 90% thereof. However, it is preferred to condense no more than about 95% of the air. While it is preferred for economic reasons to condense at least a major proportion of the mine air, the invention is fully operable where only an infinitesimal fraction of air is condensed. In fact, for special applications, it might be desirable to condense less than 50% of the air. A practical lower limit would be to condense at least 5 or 10% of the impure air. The process conditions necessary to achieve the desired degree of condensation are well known in the art to depend upon temperature and pressure. All that is required in the present invention is to partially condense a desired fraction of impure air at a rate preferably not exceeding the stated maximum. This can be accomplished by providing refrigerant to the condenser in a known manner and by adjusting the air pressure if desirable. Suitable condensation is readily achieved at atmospheric pressure and thus it is preferred, for purposes of economy, to operate at ambient pressure. However, the pressure of the air to be liquefied can be varied if desired and the temperature to which the air must be cooled will depend upon that pressure. For example, at a pressure of from 1 to 1.1 atmospheres absolute, the air is cooled to a temperature of from about 78 to 80° K.

The apparatus according to the invention can be conveniently utilized in any working area of a mine such as a mine spur or stope. The apparatus can be readily mounted on wheeled vehicles for transport to various locations and can be set up for use in an area being worked. The work area can be sealed in any convenient manner and the device would be utilized to maintain the air in that area at a safe level. Operation of the device can be regulated either manually or automatically in dependence upon a monitored radon level if desired.

It has been determined that the cost of the present system compares favorably with the cost of present ventilating systems. Using forced air ventilating systems, it has been found that the present cost to decrease below 3.0 working levels with a provision for 1.0 working level in the downshaft and haulageways is about $1.30 per ton for 120,000 c.f.m. in an 850 ton per day mine, and it is estimated that the cost to decrease below 1.0 working level with a provision for 0.3 working levels in the downshaft and haulageways is $4.50 per ton for 300,000 c.f.m. in an 850 ton per day mine. The estimated cost to decrease a typical 100 ton per day stope to below 0.3 working levels, using the method and apparatus according to the present invention, is $0.64 per ton. The optimum air purification system would thus comprise a forced air ventilation system for the downshaft and haulageways, and one or more radon removal units of the type described above for each sealed working area.

What is claimed is:
1. A method of purifying radon-containing air comprising the steps of partially condensing the impure air to form a gaseous air fraction rich in radon and a liquid air fraction poor in radon, separating said liquid and gas phases, and vaporizing the liquid phase to provide purified air.
2. A method according to claim 1 wherein the impure air contains up to 1,000 working levels of radon.
3. A method according to claim 1 wherein the impure air contains up to 500 working levels of radon.
4. A method according to claim 1 wherein the liquid fraction is condensed by cooling the impure air to a temperature of from 78 to 80° and at a pressure from 1.0 to 1.1 atm. absolute.
5. A method according to claim 1 wherein from 50 to 95% of said impure air is condensed.
6. A method of reducing the radon content of air comprising the steps of cooling a quantity of air containing up to 500 working levels of radon to condense up to 95% of the impure air, separating the condensed air and uncondensed air, and vaporizing the condensed air to provide purified air having a radon content of no more than 10% of the total amount of radon present in the original quantity of air.
7. A method according to claim 6 wherein the air is condensed at a slow rate to minimize the entrapment of radon particles in the condensate.
8. A method according to claim 6 wherein the air is condensed at a rate such that the molecular drift velocity at the liquid-gas interface is not greater than 100 cm./min.
9. A method according to claim 6 wherein the air is condensed at a rate of not more than about 3.4 cubic feet of gaseous air per square foot of condenser surface per minute.
10. A process according to claim 6 wherein the condensed air is agitated to remove radon atoms therefrom.
11. A process according to claim 10 wherein the condensed air is agitated by bubbling cold helium gas therethrough.

References Cited
UNITED STATES PATENTS

| | | | |
|---|---|---|---|
| 2,571,014 | 10/1951 | Colburn et al. | 62—23H |
| 3,057,167 | 10/1962 | Yendall et al. | 62—18 |
| 3,203,866 | 8/1965 | Lemmer et al. | 252—301.1WD |

NORMAN YUDKOFF, Primary Examiner

A. F. PURCELL, Assistant Examiner

U.S. Cl. X.R.

62—9; 252—301.1